United States Patent [19]

Buttner

[11] Patent Number: 4,494,576
[45] Date of Patent: Jan. 22, 1985

[54] REINFORCING SYSTEM FOR CONCRETE PIPE

[75] Inventor: Robert C. Buttner, Syracuse, N.Y.

[73] Assignee: Concrete Pipe & Products Corp., E. Syracuse, N.Y.

[21] Appl. No.: 511,485

[22] Filed: Jul. 7, 1983

Related U.S. Application Data

[63] Continuation-in-part of Ser. No. 381,222, May 29, 1982, abandoned.

[51] Int. Cl.³ .................. F16L 55/00; B21F 27/20
[52] U.S. Cl. .................. 138/175; 140/107; 245/2
[58] Field of Search .................. 138/175; 245/2; 140/92.1, 107; 139/381 R, 381, 425; 52/661, 662, 664, 669, 676

[56] References Cited

U.S. PATENT DOCUMENTS

| | | | |
|---|---|---|---|
| 1,269,553 | 6/1918 | Collis | 138/175 |
| 3,840,054 | 10/1974 | Tolliver | 138/175 |
| 4,184,520 | 1/1980 | Tolliver | 138/175 |
| 4,270,583 | 6/1981 | Tolliver | 140/92.1 |
| 4,345,626 | 8/1982 | Tolliver | 138/175 |

Primary Examiner—John W. Shepperd
Attorney, Agent, or Firm—Bruns & Wall

[57] ABSTRACT

A truss assembly for reinforcing concrete pipe that includes a mat into which has been woven a series of longitudinally spaced truss bridges that extend across the width of the mat. The mat is cast into a pipe at the points of maximum stress so that the bridges provide circumferentially positioned load carrying sections that are capable of resisting relatively high internal shear and tensile stresses.

5 Claims, 5 Drawing Figures

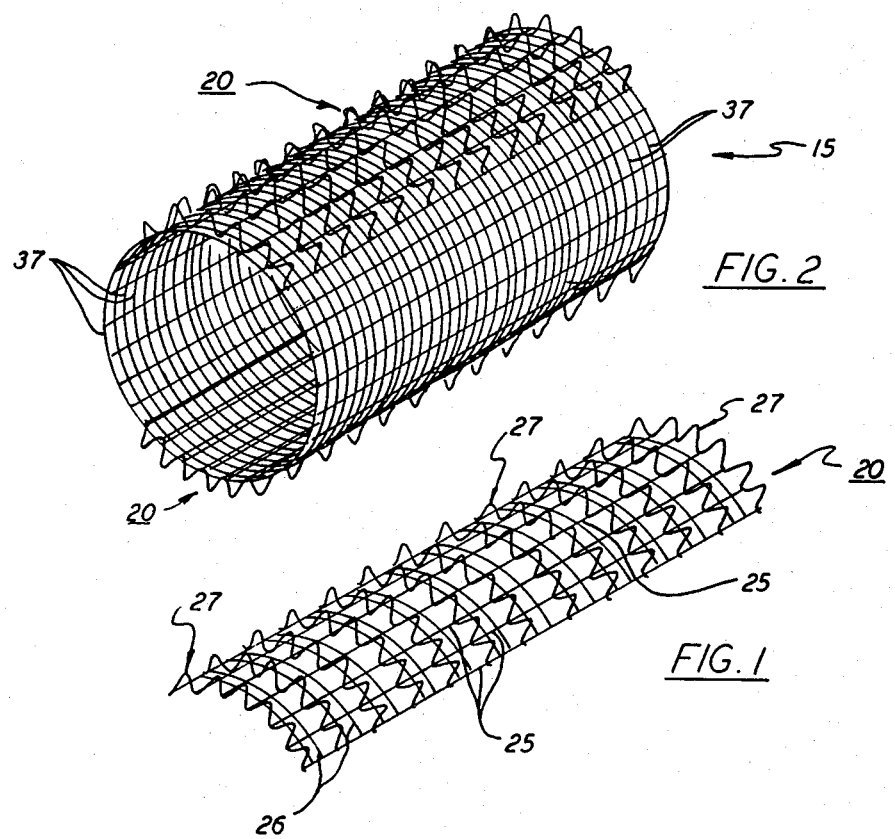
FIG. 2
FIG. 1
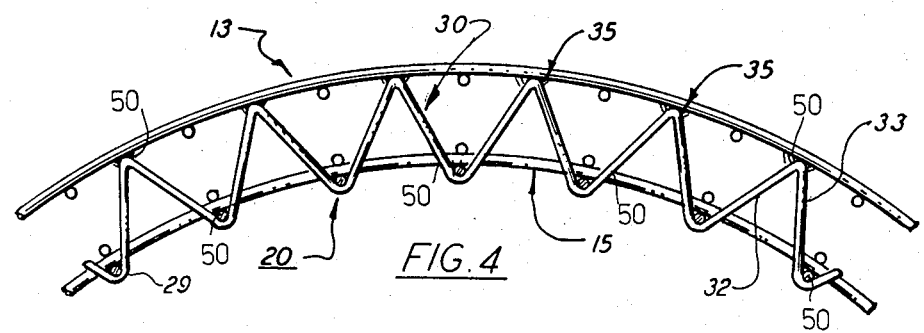
FIG. 4
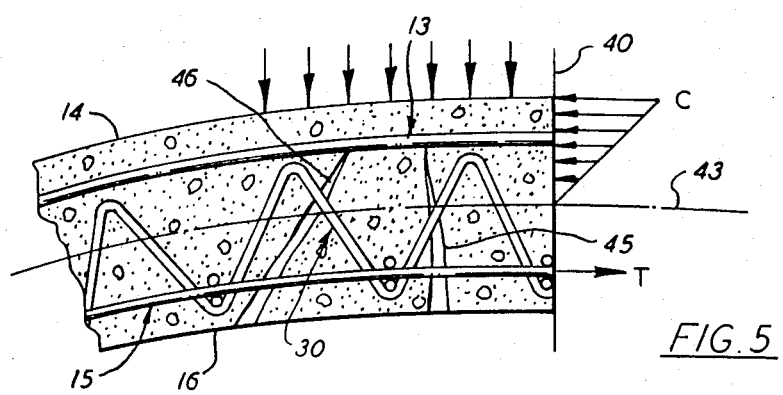
FIG. 5

REINFORCING SYSTEM FOR CONCRETE PIPE

BACKGROUND OF THE INVENTION

This is a continuation-in-part of copending application Ser. No. 381,222 filed May 24, 1982 now abandoned.

This invention relates generally to improved concrete pipe and, in particular, to an improved wire reinforcing system suitable for use in concrete pipe construction in which circumferentially extended truss bridges are built into the system to resist both shear and tension stresses.

As is well known, concrete is relatively strong in compression but comparatively weak in tension. It is therefore common practice, particularly in the construction of large diameter concrete pipes, to reinforce the concrete with steel wire which is cast into the structure to accept high tensile loads in critical regions. In the case of a large diameter pipe, the reinforcing system oftentimes takes the form of two telescoped wire mesh cages. The first or inner cage is placed near the inner wall of the pipe while the second or outer cage is positioned near the outer wall of the pipe. The cages act independently to take up any tension stress that acts circumferentially along the pipe near the inner and outer surfaces.

As the size demand for concrete pipe increased, the load that the pipe was required to resist also increased. The double cage arrangement was found to be inadequate under this increased loading. Additional shear and diagonal tension stress were encountered that could not be successfully combatted by the two cage arrangement. Accordingly, radially extended stirrups were added to the reinforcing system in an effort to control these new forces. Typically the stirrups are tied, as by welding, to the inner cage and extended outwardly toward the outer cage. The stirrups resist diagonal stress to some extent and also serve to prevent slabbing at the inner wall. Slabbing is a failure wherein the inside cage tends to flatten out at the invert and the crown sections whereupon the cage moves or pulls away from the pipe wall.

Stirrups having a hook-like configuration are disclosed in U.S. Pat. Nos. 4,184,520 and 4,295,497. Another common type of stirrup having a bedspring design is disclosed in U.S. Pat. Nos. 3,411,544; 3,411,545, 3,411,546 and 3,419,047. The bedspring arrangement involves the use of a number of sinusoidal wires that are extended axially along the length of the pipe so that the waves form stirrup-like members. In practice, the springs are welded to one or both cages. The stirrups act quite well in resisting shear stresses and also help prevent slabbing. They cannot, however, effectively combat tension stresses that accompany high loading forces. Furthermore, in most stirrup arrangements, at least one end of the stirrup is anchored in a tension zone which enables the stirrups to move when the pipe is loaded thereby adversely affecting the ability of the system to withstand certain types of stresses. It should also be noted that most stirrup systems increase the amount of steel used in the pipe and are extremely difficult to install thereby considerably raising the cost of pipe.

In U.S. Pat. No. 3,840,054 an axial extended "bedspring" is brought into a mat configuration and the rows of stirrups making up the bedspring are hinged into the mat so that they may be folded back into the plane of the mat for storage. The hinged sections extend the length of the mat and are rolled into the pipe mold so that the hinge line remains in a linear plane parallel to the axis of the pipe. Bending the hinged sections along the circumference of the pipe would, of course, cause the hinges to break and be pulled away from the mat. This, in turn, will render the stirrups inoperative. As is the case of unhinged axially extended bedspring stirrup mats, this type of mat is not utilized as a circumferential truss to resist both shear and tension stresses as typically found in the crown and invert sections of an externally loaded pipe.

Collis in U.S. Pat. No. 1,269,553 discloses a hoop that is cast directly into a concrete pipe. Structurally, the hook consists of two circular wires that are joined by a series of truss wires. The hoop will provide some localized reinforcement in the pipe, however, failure can easily occur a short distance from the hoop.

U.S. Pat. No. 3,841,591 discloses a cylindrical reinforcing cage as typically used in concrete pipe construction. Wave-like strands are welded to the axial tie wires at one end of the cage. The strands all lie in a circular plane defining the normal diameter of the cage. In practice, this end of the cage is expanded to form a bell-like joint. When expanded, the strands, due to their wave configuration, deform in a circular plane to hold the tie wire in assembly. The strands do not extend radially either before or after the bell is formed and thus cannot function to resist both internal shear and tension stresses developed within the pipe.

Lastly, a U.S. Pat. No. 4,345,626 also issued to Tolliver that describes an easily deformable mat for reinforcing concrete pipe. The mat consists of axially aligned tie wires that are connected to spring-like cross wires. The cross wires are simple, relatively thin, easily deformable wires that are periodically bent to provide upraised U-sections or stirrups. The mat is able to be stored and shipped in a flat condition. When the pipe is cast, the mat is rolled into a curved configuration with the cross wires extending circumferentially within the pipe. The mat, because of its spring-like construction, has relatively poor stress resisting characteristics and cannot by itself greatly strengthen the pipe unless it is securely welded to an inner cage or the like.

SUMMARY OF THE INVENTION

It is therefore an object of the present invention to improve concrete pipe.

A further object of the present invention is to improve reinforcement systems used in large concrete pipes.

A still further object of the present invention is to provide improved mechanical anchorage for steel reinforcing wires used in concrete pipe.

Another object of the present invention is to provide improved resistance to shear and tension stresses on concrete pipes.

Yet another object of the present invention is to provide a truss type of reinforcing system for use in large diameter concrete pipes which will reduce the amount of steel required while at the same time provide improved load resistance characteristics to the pipe.

A still further object of the present invention is to provide a mat having laterally extended trusses woven therein which can be passed through the inner cage of a concrete pipe reinforcing system to provide improved load carrying capabilities to the system.

These and other objects of the present invention are attained by means of a truss mat that is capable of being carried at the invert and crown of a concrete pipe to either replace or reinforce the inner cage of the pipe. The mat includes a curved fabric into which is woven a series of circumferential bridges made up of triangular truss members that are arranged to span across the neutral axis of the pipe. Because of the strength of this construction, the truss mat can be used to replace the inner cage typically used to reinforce larger pipes.

BRIEF DESCRIPTION OF THE DRAWINGS

For a better understanding of these and other objects of the present invention reference is had to the following detailed description which is to be read in conjunction with the accompanying drawings, wherein:

FIG. 1 is a perspective view of an arcuate shaped truss mat embodying the teachings of the present invention;

FIG. 2 is a perspective view of an arcuate shaped truss mat embodying the teachings of the present invention showing the mat secured to the inner cage of a concrete pipe reinforcement system;

FIG. 4 is a partial side view of a reinforcement system utilizing the truss mat shown in FIG. 2 wherein the mat is secured to both the inner and outer cages of the system; and FIG. 5 is an enlarged partial side view in section of the crown of a concrete pipe section illustrating the effects of a high external load thereon.

DESCRIPTION OF THE INVENTION

Figure 3:
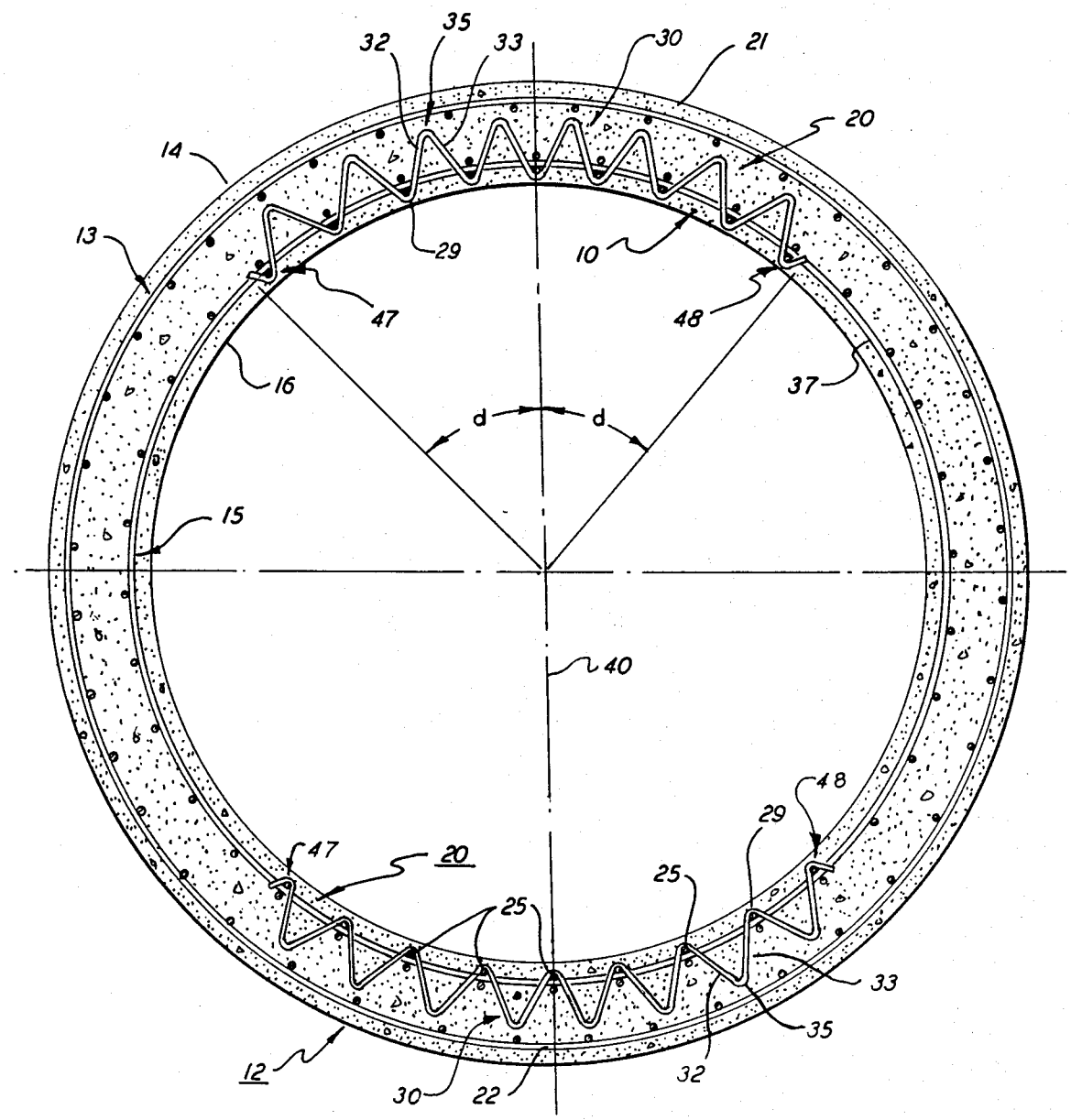
FIG. 3 is an enlarged side view in section showing a concrete pipe containing a reinforcement system embodying the teachings of the present invention.

Turning initially to FIGS. 1–3, there is shown a reinforcing system 10 for a concrete conduit which in this embodiment of the invention is a circular pipe 12. The reinforcing system is comprised of an outer cage 13 (FIG. 3) that is positioned adjacent to the outside wall 14 of the pipe, an inner cage 15 that is positioned adjacent to the side wall 16 of the pipe and two stirrup mats 20—20 that are strategically located in the upper crown region 21 and the lower invert region 22 of the pipe wherein high loading forces are developed when the pipe is buried in the ground. As will become apparent from the disclosure below, the truss mat of the present invention, because of its high strength construction can replace the inner cage as typically used to reinforce larger size pipes. Although two stirrup mats are shown in the preferred embodiment of the invention, the number of mats may be varied in accordance with different load factors or load placements without departing from the teachings of the present invention. Where extremely high loads are encountered, it may be advisable to place mats about the entire circumference of the pipe to help resist stresses in all zones.

As illustrated in FIG. 1, each mat 20 includes a series of spaced-apart, linear tie wires 25—25 that, in assembly, pass axially along the length of the pipe. A second series of curved support wires 26—26 and interdispersed truss unit or bridge 27—27 extend circumferentially across the width of the mat perpendicular to the tie wires. The curved support wires and truss bridges are equally spaced along the length of the mat to create an open, mesh-like fabric. As illustrated in FIG. 1, in the present embodiment of the invention there are two curved support wires positioned between each adjacent pair of truss bridges to provide a two to one ratio of support wires to truss bridge units. This ratio can be varied, however, in accordance with changing load factors. For example, less truss bridges would be needed where light loads are present while more bridges would be used under higher load conditions. It should be noted, however, that in any assembly, each truss bridge replaces a curved support wire in the mesh fabric and thus serves to lighten the weight of the mat and reduce the cost of the structure without sacrificing strength.

Each laterally extended truss bridge is constructed from a continuous strand of steel wire that is looped under each of the tie wires as shown in FIG. 3 to form a bight 29 thereagainst. After looping under the tie wire, the truss wire is brought over the surface of the mat to form a triangular-shaped truss section 30 before it is looped under the next adjacent tie wire. Each truss section lies in the lateral plane described by the truss bridge and contains a pair of straight diagonal legs 32 and 33 that are cojoined at the node 35 by a relatively sharp bend. The included angle between the legs is preferably about 60°.

As should now be evident, each truss unit forms a bridge-like structure that spans across the width of the mat. The triangular truss sections making up the bridge are welded by welds 50 at each bight to the abutting tie wire to help support the span in assembly and to provide added strength. The rigid triangular-shaped sections are extremely effective in resisting stress and carrying high loads that are placed on the truss bridge. The triangle is basically a shape that does not tend to fold or deform when subjected to a load at any of the vertices and thus is ideally suited for use in this type of reinforcing system.

The crown mat and the invert mat shown in FIG. 3 are both secured to the inner cage of the reinforcing system by means of a tack welds 50. It should be noted, however, that the inner cage may be eliminated in many applications with the two mats in effect taking over the function of the inner cage. The mats are installed by inserting the nodes 35 of the truss member sections through the mesh openings in the inner cage. The mats are given the same curvature as the cage and therefore can be abutted against the inner periphery of the cage over the entire surface area of the mat. The spacing of the truss member sections is in multiples of the longitudinal spacing of the cage hoops 37—37 so that the mats are compatible with the cage. Preferably, both the crown mat and the invert mat are centered about the vertical axis 40 of the pipe in assembly and transcend an angle (d) of between 30° and 45° to either side of the vertical axis. The mats are secured to the inner cage as by welding to create a structure as illustrated in FIG. 2 that is easily telescoped inside of the outer cage and installed therewith within the pipe mold. When so installed concrete is poured about the reinforcing system and allowed to set or cure in contact therewith.

With further reference to FIG. 4, there is shown another means of assembling the reinforcing system of the present invention. In this arrangement, the nodes 35—35 of the truss sections are abutted against the outer cage and are welded thereto by means of tack welds 50 to provide a more unitized reinforcing system that can be more easily and accurately positioned within a pipe mold. As will be described in greater detail below, by welding the section nodes to the outer cage further improves the stability of the reinforcing system and also provides the system with strength.

Turning now to FIG. 5, there is shown a section of pipe that is taken at the crown and which shows in slightly exaggerated detail the types of stress cracks that are typically generated in this area of high loading. When the pipe is buried in the ground, a concentrated load is exerted by the earth at the crown of the pipe which is depicted by the downwardly directed force vectors shown acting upon the outer wall 14 of the pipe. The external force, in turn, produces internal compressive tensile and shear forces in the pipe. Since concrete is strong in compression, the pipe is usually able to resist the compressive stresses quite well. On the other hand, steel reinforcing wire is usually required to take up the other internal stresses.

As shown diagrammatically in FIG. 5, the external load produces a compressive stress (C) in the pipe in the outer section above the neutral axis 43 of the pipe. Below the neutral axis, the load produces a tension (T) on the pipe. Along the neutral axis, where the internal stress changes from compression to tension, high shear forces are also developed. Similar stresses are also developed at the invert section of the pipe. As a result of this stress system, two types of cracks are generated in the pipe. The first is called radial cracking wherein fissures or cracks begin at the inside surface of the pipe and move outwardly in a radial direction. Such a crack is noted at 45 in FIG. 5. A second type of crack, as depicted at 46, is a diagonal crack that again begins at the inside wall some distance from the vertical axis and passes obliquely towards the axis as shown.

The bridge-like truss members of the present invention are ideally suited to withstand internal stress of the type described above. In assembly, the two anchor points 47 and 48 (FIG. 3) of the individual truss bridges are placed in the concrete beyond counterflexure regions which are areas of high compressive loading. This typically will occur at some place between 30° and 45° to either side of the vertical axis 40. As a result of this placement, the truss bridges are securely anchored against movement in the concrete and are most importantly able to translate high tension and shear stress exerted on the bridge into these areas of high compressive stress which are quite able to accept this type of load. It should be further noted that by making the truss member sections triangular in form, the sections will not tend to collapse or straighten out when a high external load is placed on the pipe thereby further enhancing the stability and strength of the reinforcing system.

Another unique feature that provides added strength to the truss is the fact that each of the triangular-shaped stirrups which go to making up the bridge arrangement are passed upwardly well beyond the neutral axis of the pipe into a region of high compressive stress. Accordingly, not only is each stirrup securely anchored in the compressed concrete but the entire bridge structure is further supported against movement and/or collapse. This coupled with the fact that the stirrups are securely tied to the inner cage prevents the inner cage from moving under stress and thus, in turn, prevents the cage from pulling away from the inside wall and the concrete from slabbing.

By forming a series of laterally extended bridges of the type herein described within the areas of high tensile and shear stress, the stresses are taken up by the reinforcing wire thereby preventing both radial and diagonal cracking. It should be further noted that while the truss wires crisscross the regions of high stress concentration, the cage hoops move circumferentially therethrough. As a result, one of the reinforcing wires will usually cross a crack boundary or potential crack boundary at right angles and thus provide maximum resistance to this type of failure. Clearly, stirrups that run along the length of a pipe rather than across its width cannot deliver the resistance or load carrying capability exhibited by the bridge-like truss members disclosed herein.

While this invention has been described with reference to the details as set forth above, it is not limited to the specific structure as disclosed and the invention is intended to cover any modifications or changes as may come within the scope of the following claims.

I claim:

1. In a concrete pipe that is subjected to high external loads at the crown and the invert which produce a compressive stress on one side of the neutral axis of the pipe and a tensile stress on the other side thereof, reinforcing apparatus for transmitting stresses from one side of the neutral axis to the other that includes
   an inner cylindrical wire cage mounted inside the neutral axis of the pipe,
   arcuate shaped wire mats joined to the inner cage at both the crown and invert,
   each of said mats having a series of spaced apart curved wires that complement the curvature of the inner cage and which are circumferentially disposed in the pipe to place each end of the mat in a region of compressive stress thereby anchoring the ends of the curved wires in compression, and a series of spaced apart longitudinally extended wires cojoined to the curved wires,
   a series of curved circumferentially disposed wire truss members woven at intervals into each mat, each truss member having a series of end to end upraised V-shaped sections connected by nodes and antinodes, each of the said antinodes being looped under a separate longitudinal mat wire and being joined to a curved wire of said cage, each node passing upwardly in a radial direction across the neutral axis of the pipe whereby stresses produced on one side of the pipe are translated to the other side of the axis along the entire length of the bridge.

2. The apparatus of claim 1 that further includes an outer cylindrical wire cage mounted outside the neutral axis of the pipe which abuts the nodes of the truss members and means to affix the nodes to the outer cage.

3. The apparatus of claim 1 wherein the included angle between the V-shaped sections at the nodes and the antinodes is about 60°.

4. Apparatus for reinforcing a concrete pipe that includes
   a series of stiff spaced apart curved wires that complement the curvature of a pipe and which are cojoined by a series of spaced apart longitudinally disposed tie wires to from an open mesh arcuate shaped mat, and
   a series of circumferentially extended wire truss members woven into the arcuate shaped mat at longitudinally spaced intervals, each truss member having a series of upraised V-shaped sections, the legs of which form included angles of about 60° at the nodes and the antinodes, each antinode being looped around a longitudinal tie wire and being cojoined to said longitudinal tie wire to form a truss bridge extending across the circumferential length of the mat.

5. The apparatus of claim 4 wherein the number of truss bridges woven into the mat are unequal to the number of curved mat wires.

* * * * *